(12) United States Patent
Kalampoukas et al.

(10) Patent No.: US 10,945,030 B2
(45) Date of Patent: Mar. 9, 2021

(54) DETECTION OF POTENTIAL COMMERCIAL BY DETECTION AND ANALYSIS OF TRANSITIONS IN VIDEO CONTENT

(71) Applicant: Alphonso Inc., Mountain View, CA (US)

(72) Inventors: Lampros Kalampoukas, Brick, NJ (US); Manish Gupta, Bangalore (IN); Zhengxiang Pan, Edison, NJ (US)

(73) Assignee: ALPHONSO INC., New York, NY (US)

( * ) Notice: Subject to any disclaimer, the term of this patent is extended or adjusted under 35 U.S.C. 154(b) by 366 days.

(21) Appl. No.: 15/941,561

(22) Filed: Mar. 30, 2018

(65) Prior Publication Data
US 2019/0306565 A1 Oct. 3, 2019

(51) Int. Cl.
H04N 21/44 (2011.01)
H04N 21/439 (2011.01)
H04N 21/454 (2011.01)
G06K 9/00 (2006.01)

(52) U.S. Cl.
CPC ... *H04N 21/44008* (2013.01); *G06K 9/00758* (2013.01); *G06K 9/00765* (2013.01); *H04N 21/4394* (2013.01); *H04N 21/4542* (2013.01)

(58) Field of Classification Search
CPC .............. H04N 21/812; H04N 21/4331; H04N 21/44008; H04N 21/2407; H04N 21/44016; H04N 21/23418
See application file for complete search history.

(56) References Cited

U.S. PATENT DOCUMENTS

| | | | |
|---|---|---|---|
| 6,819,863 B2 | 11/2004 | Dagtas et al. | |
| 7,400,364 B2* | 7/2008 | Chen | H04N 5/50 348/465 |
| 8,925,024 B2 | 12/2014 | Wright et al. | |
| 9,628,836 B1 | 4/2017 | Kalampoukas et al. | |

(Continued)

OTHER PUBLICATIONS

Brandon Satterwhite and Oge Marques, "Automatic Detection of TV Commercials." (Satterwhite, B.; Marques, O.; Potentials, IEEE, vol. 23, Issue 2, Apr.-May 2004, pp. 9-12 (4 pages).

(Continued)

*Primary Examiner* — Hsiungfei Peng
(74) *Attorney, Agent, or Firm* — Panitch Schwarze Belisario & Nadel LLP

(57) ABSTRACT

A system and method are provided for detecting the presence of potential commercials in a video data stream. Each of the commercials has an expected time length that is an integer multiple of a first predetermined time length, and has an overall time length that is equal to or less than a second predetermined time length. Transitions in the audio or video of the video data stream are detected and the time of the transitions are recorded. Time differences between one or more successive transitions are detected. Any time differences that are an integer multiple of the first predetermined time length, and that have an overall time length that is equal to or less than the second predetermined time length are identified. The contents of the video data stream associated with the identified time differences are flagged as potential commercials and sent to a content processing platform for further analysis.

14 Claims, 5 Drawing Sheets

(56) References Cited

U.S. PATENT DOCUMENTS

| | | |
|---|---|---|
| 10,108,718 B2 | 10/2018 | Kalampoukas et al. |
| 2003/0121046 A1 | 6/2003 | Roy et al. |
| 2006/0041902 A1* | 2/2006 | Zigmond .............. H04H 60/31 |
| | | 725/9 |
| 2011/0289114 A1 | 11/2011 | Yu et al. |
| 2013/0071090 A1 | 3/2013 | Berkowitz et al. |
| 2013/0205318 A1 | 8/2013 | Sinha et al. |
| 2017/0155973 A1* | 6/2017 | Muller ................ H04N 21/812 |

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.

Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.

Gracenote Entourage™, Gracenote, Inc., Emeryville, California, downloaded from webpage: http://www.gracenote.com/video/media-recognition-and-insights/, download date: Aug. 24, 2016, 5 pages.

Int'l Search Report and Written Opinion dated May 27, 2019 in Int'l Application No. PCT/US2019/024277.

* cited by examiner

DETECTION OF POTENTIAL COMMERCIAL BY DETECTION AND ANALYSIS OF TRANSITIONS IN VIDEO CONTENT

BACKGROUND OF THE INVENTION

TV advertising commercials exist in virtually all video data streams, subsidizing some or all of the cost of providing the content to the viewer. The ability to identify where the commercials exist in the video data stream has become an important goal for two main reasons. First, advertisers who pay to place the commercials wish to verify that the commercials were actually played, either by being "aired" during a broadcast, or "streamed" during an internet-based viewing session. The auditing process can be greatly enhanced if commercials can be identified as they are being played so that there can be a recordation to document the airing or streaming. Second, technology built into a video playing device, or executing concurrently with a video playing device, can "skip" commercials, assuming that the location of the commercials can be accurately identified so that no programming is skipped. Some conventional technology for identifying where commercials exist in a video data stream is described in an article entitled "Automatic Detection of TV Commercials" (Satterwhite, B.; Marques, O.; Potentials, IEEE, Volume 23, Issue 2, April-May 2004 pp. 9-12, hereafter, referred to as "Satterwhite et al."). Satterwhite et al. describes two main categories of methods for detecting commercials, namely, "feature-based detection" and "recognition-based detection." Feature-based detection uses general characteristics of commercials embedded within a media stream to detect their possible presence. Recognition-based detection works by trying to match commercials with ones that were already learned. Some general characteristics (heuristics) of commercials and commercial breaks include the following:

i. Multiple frames of black are displayed at the beginning and end of each commercial block and between each commercial in the block. There is no audio during these frames.

ii. If a network displays a logo in the corner of the screen, the logo will not appear during the commercials.

iii. Duration is typically some increment of 15 seconds, up to 90 seconds.

iv. Commercials are high in "action," measured by a relatively larger number of cuts per minute between frames compared to a TV show.

v. Commercial breaks tend to occur at the same time in each episode of a given TV series.

The conventional technology for identifying where commercials exist in a video data stream have numerous disadvantages which limit their effectiveness. Furthermore, even if a commercial break can be accurately identified, this information does not necessarily identify where the individual commercial appear within the commercial break. Accordingly, there is a need for new approaches for identifying where individual commercials exist in a video data stream. The present invention fulfills such a need.

SUMMARY OF THE PRESENT INVENTION

A system and method are provided for detecting the presence of potential commercials in a video data stream. Each of the commercials has an expected time length that is an integer multiple of a first predetermined time length, and has an overall time length that is equal to or less than a second predetermined time length. Transitions in the audio or video of the video data stream are detected and the time of the transitions are recorded. Time differences between one or more successive transitions are detected. Any time differences that are an integer multiple of the first predetermined time length, and that have an overall time length that is equal to or less than the second predetermined time length are identified. The contents of the video data stream associated with the identified time differences are flagged as potential commercials and sent to a content processing platform for further analysis.

BRIEF DESCRIPTION OF THE DRAWINGS

Preferred embodiments of the present invention will now be described by way of example with reference to the accompanying drawings.

DETAILED DESCRIPTION OF THE INVENTION

Figure 1:
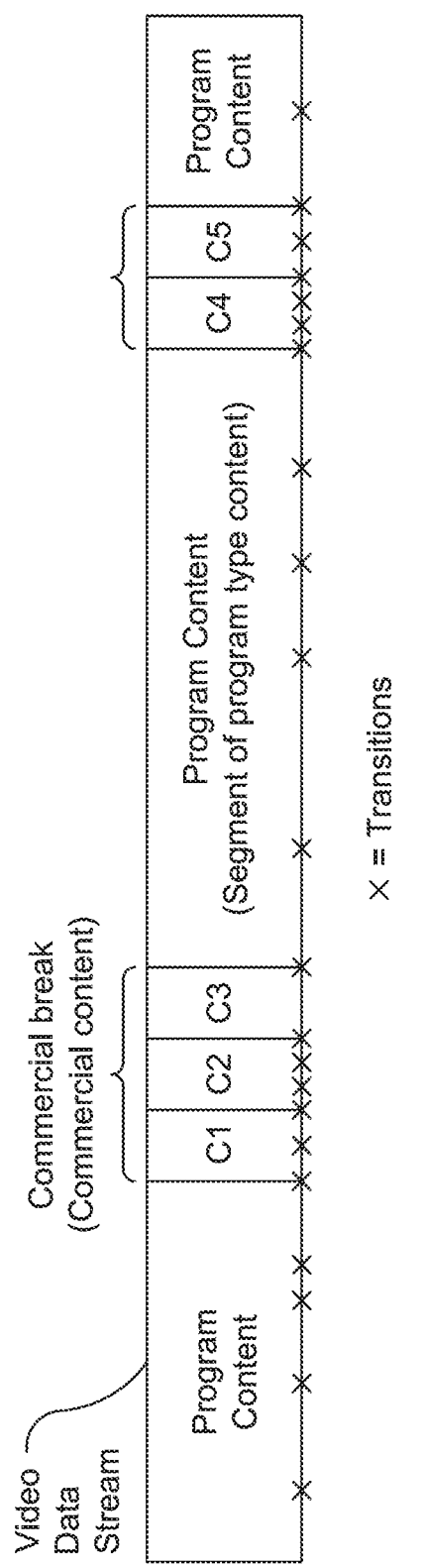
FIG. 1 is a video data stream showing a plurality of identified transitions.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

segment (also, referred to interchangeably as a "content segment")—A segment is a portion of a video data stream that spans a time length. The segment includes the contents of the video data stream within that time length.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program.

The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

clip—The video data stream may be clipped between a start time and a stop time so as to capture a segment of interest, typically a potential commercial that has not yet been identified.

repeating content—Repeating content is any content that appears more than once over a time period of interest. Examples of repeating content include commercials and program type content (e.g., a TV show) that is rebroadcast. The time period of interest may be finite or infinite.

integer multiple—An integer multiple is a whole number, such as 1, 2, and so on. However, the scope of "integer multiple" as defined herein and used in the present application is meant to capture time lengths that are very close to an integer multiple so as to capture potential commercials that are very slightly longer or shorter than a typical standard commercial length, as described further below.

II. Detailed Disclosure

FIG. 1 shows an example of a video data stream that is a live TV stream (e.g., TV channel) wherein commercial breaks are interspersed during a normal TV program, identified as "program content" or "non-commercial content." Stated another way, commercial content in the form of commercial breaks is interspersed between segments of program type content. The illustrated portion of the video data stream includes one commercial break having three commercials (C1, C2 and C3) and another commercial break having two commercials (C4, C5). However, the commercial breaks and the fact that there are three commercials in the first commercial break and two commercials in the second commercial break may be initially unknown. The methods described herein may be used to identify the individual commercials, regardless of whether the existence and location of a commercial break within the video data stream, or individual commercials within the commercial break are known.

Figure 2:
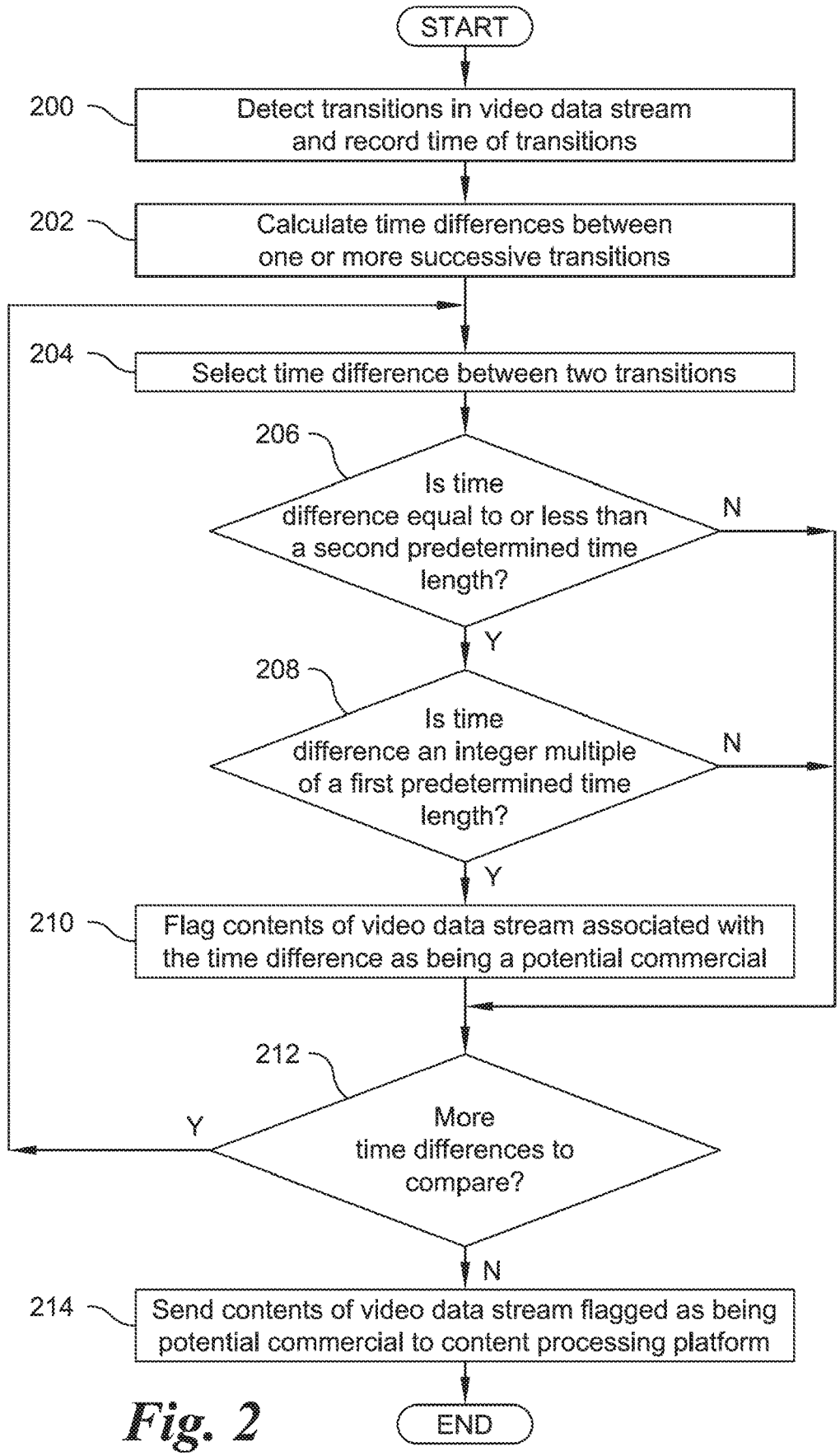
FIG. 2 is a flowchart for implementing one preferred embodiment of the present invention.

More specifically, an automated method is provided for detecting the presence of potential commercials in a video data stream that contains segments of program type content, and commercial content, wherein the commercial content appears in a commercial break between segments of program type content. Each commercial break includes one or more commercials. Each of the commercials has an expected time length that is an integer multiple of a first predetermined time length, and has an overall time length that is equal to or less than a second predetermined time length. Referring to FIGS. 1 and 2, the method operates as follows:

STEP 200: A video processing engine (labeled in FIG. 5 as element 502) detects transitions in the audio or video of the video data stream and records the time of the transitions. Examples of a transition include consecutive black frames, silent audio frames, significant changes in audio level, significant changes in image nature or quality, or any combination thereof. Transitions are identified in FIG. 1 by the marked "x's." One or more of these types of transitions may occur within the program content, within individual commercials, between individual commercials, and before and after a commercial break. If multiple types of transitions are detected at the same point in time (e.g., consecutive black frames and silent audio frames; significant changes in audio level and significant changes in image nature or quality), the transition is still detected as one transition.

STEP 202: The video processing engine 502 uses the time of the transitions to calculate for each transition time differences between one or more successive transitions.

STEPS 204, 206, 208, 210, 212: The video processing engine 502 identifies any time differences that are an integer multiple of the first predetermined time length, and that have an overall time length that is equal to or less than the second predetermined time length, wherein the contents of the video data stream associated with the identified time differences are potential commercials.

STEP 214: Contents of the video data stream that are associated with the identified time differences are sent to a content processing platform that performs recognition processing of the contents to identify any potential commercials.

In one preferred embodiment, the first predetermined time length is 5 seconds or 15 seconds, and the second predetermined time length is 60 seconds. Thus, if the first predetermined time length is 5 seconds, an integer multiple of this time length may be 5 seconds (integer multiple=1), 10 seconds (integer multiple=2), and so on. If the first predetermined time length is 15 seconds, an integer multiple of this time length may be 15 seconds (integer multiple=1), 30 seconds (integer multiple=2), and so on.

In an alternative embodiment, the first predetermined time length is 3 seconds, and the second predetermined time length is 60 seconds. Thus, if the first predetermined time length is 3 seconds, integer multiples of this time length may be 6 seconds (integer multiple=2), 15 seconds (integer multiple=5), 30 seconds (integer multiple=10), and so on. This alternative embodiment may be used when networks air shorter format commercials, such as 6 second commercials.

Referring to FIG. 2, consider the following example of detected transitions in video data streams wherein the first predetermined time length is 15 seconds, and the second predetermined time length is 60 seconds. Also, in this example, T1 and T2 are successively adjacent transitions, which means that there are no other transitions detected between T1 and T2.

In this example, T1 represents a first transition, and T2 represents a second transition adjacent to T1. T1 and T2 are simply any detected transitions. Thus, T1 in Example 1 is not necessarily T1 in any of the other examples. However, the same transition may be part of two pairs of detected transitions. For example T2 in Example 1 may be T1 in Example 2. Likewise, T1 in Example 1 may be T2 in Example 3. The video data streams in FIG. 2 are not necessarily in any sort of chronological order and they are not necessarily part of the same video data stream. The time values in FIG. 2 are military time in hours, minutes and seconds. Thus, 13:00:00 is exactly 1:00 pm. 13:30:30 is thirty seconds after 1:30 pm. The time values would also typically include data information, but for brevity, the date information is not shown.

Figure 3:
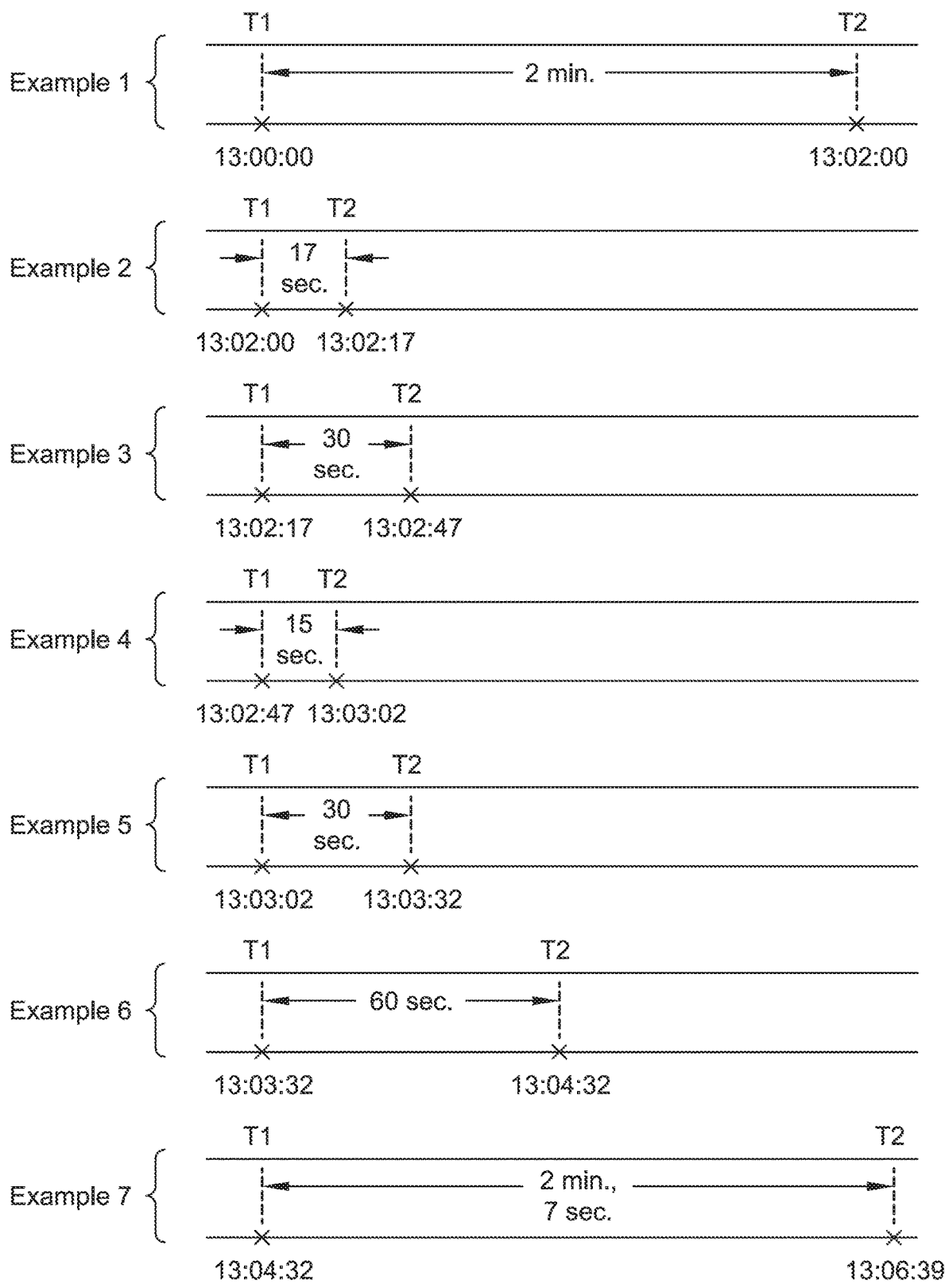
FIGS. 3 and 4 illustrate portions of a video data stream that shows transitions which are analyzed in accordance with one preferred embodiment of the present invention.

For ease in understanding of the invention, the example of FIG. 3 shows a plurality of successively adjacent detected transitions from the same video data stream. However, each analyzed pair of detected transitions is referred to as T1 and T2, and not T1, T2, T3, and so on.

Example 1

T1 occurs at 13:00:00 and T2 occurs at 13:02:00. The time difference is thus 2 minutes. While 2 minutes (120 sec) is an integer multiple of 15 seconds (integer multiple=8), 2 minutes is not equal to, or less than 60 seconds. Accordingly, the contents of the video data stream between T1 and T2 is not flagged as a potential commercial.

Example 2

T1 occurs at 13:02:00 and T2 occurs at 13:02:17. The time difference is thus 17 seconds. While 17 seconds is less than 60 seconds, 17 seconds is not an integer multiple of 15 seconds. (17/15=1.133). Accordingly, the contents of the video data stream between T1 and T2 is not flagged as a potential commercial.

Example 3

T1 occurs at 13:02:17 and T2 occurs at 13:02:47. The time difference is thus 30 seconds. 30 seconds is less than 60 seconds and 30 seconds is also an integer multiple of 15 seconds. (30/15=2). Accordingly, the contents of the video data stream between T1 and T2 is flagged as a potential commercial.

Example 4

T1 occurs at 13:02:47 and T2 occurs at 13:03:02. The time difference is thus 15 seconds. 15 seconds is less than 60 seconds and 15 seconds is also an integer multiple of 15 seconds. (15/15=1). Accordingly, the contents of the video data stream between T1 and T2 is flagged as a potential commercial.

Example 5

T1 occurs at 13:03:02 and T2 occurs at 13:03:32. The time difference is thus 30 seconds. 30 seconds is less than 60 seconds and 30 seconds is also an integer multiple of 15 seconds. (30/15=2). Accordingly, the contents of the video data stream between T1 and T2 is flagged as a potential commercial.

Example 6

T1 occurs at 13:03:32 and T2 occurs at 13:04:32. The time difference is thus 60 seconds. 60 seconds is equal to and 60 seconds is also an integer multiple of 15 seconds. (60/15=4). Accordingly, the contents of the video data stream between T1 and T2 is flagged as a potential commercial.

Example 7

T1 occurs at 13:04:32 and T2 occurs at 13:06:39. The time difference is thus 2 minutes and 7 seconds (127 sec). This time difference is not equal to or less than 60 seconds and it is also not an integer multiple of 15 seconds. (127/15=8.466). Accordingly, the contents of the video data stream between T1 and T2 is not flagged as a potential commercial.

The example of FIG. 3 is likely illustrating a video data stream having a commercial break of 2 minutes and 15 sec (30+15+30+60=135 sec).

Figure 4:
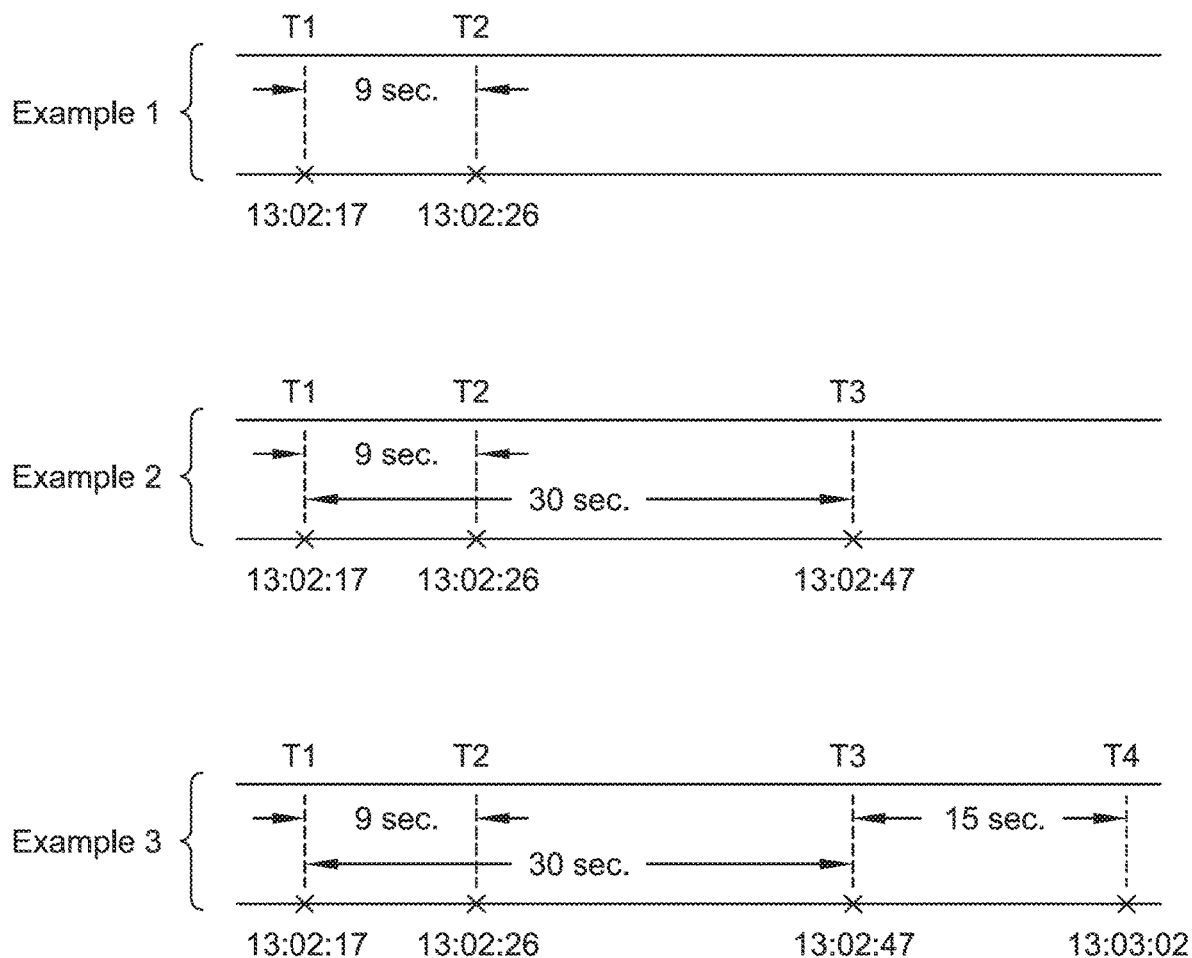

FIG. 3 illustrates an ideal scenario wherein all of the transitions in a commercial break neatly define individual potential commercials. In practice, that ideal scenario is not likely to exist, and there will be transitions detected within potential commercials that fail the test outlined above because they are not integer multiples of the first predetermined time length, here, 15 seconds. These potential commercials may be missed if only successively adjacent detected transitions were analyzed. Accordingly, in another preferred embodiment, multiple successive transitions are analyzed. FIG. 4 illustrates this process. Since multiple successive transitions are analyzed, the transitions are referred to as T1, T2, T2, T3, and so on.

Example 1

T1 occurs at 13:02:17 (same as T1 in Example 3 of FIG. 3). T2 occurs at 13:02:26. The time difference is thus 9 seconds. 9 seconds is less than 60 seconds but is not an integer multiple of 15 seconds. (9/15=0.6). Accordingly, the contents of the video data stream between T1 and T2 is not flagged as a potential commercial, at least initially.

Example 2

T3 occurs at 13:02:47 (same as T2 in Example 3 of FIG. 3). T1 and T2 from Example 1 of FIG. 3 are also repeated. The time difference between T1 and T2 is the same 9 seconds discussed above, which does not result in flagging of a potential commercial. Likewise, the time difference between T2 and T3 is 21 seconds which also does not result in flagging of a potential commercial because 21 seconds is also not an integer multiple of 15 seconds. However, in this embodiment, the time difference between T1 and T3 is also calculated, and this results in a time difference of 30 seconds, leading to the same result as Example 3 of FIG. 3, wherein the contents of the video data stream between T1 and T2 is flagged as a potential commercial. Accordingly, the contents of the video data stream between T1 and T3 is likewise flagged as a potential commercial.

Example 3

T4 occurs at 13:03:02 (same as T2 in Example 4 of FIG. 3). T1, T2 and T3 from Example 2 of FIG. 4 are also repeated. The same time differences in Example 2 of FIG. 3 are calculated, leading to the same results described above. However, additional time differences are calculated between T3 and T4, resulting in an additional flagging of a potential commercial for the same reasons as explained in Example 4 of FIG. 3. Since the contents of the video data stream between T1 and T3 has previously been flagged as a potential commercial, no comparisons need to be done regarding the time differences between T1 and T4 or T2 and T4.

Figure 5:
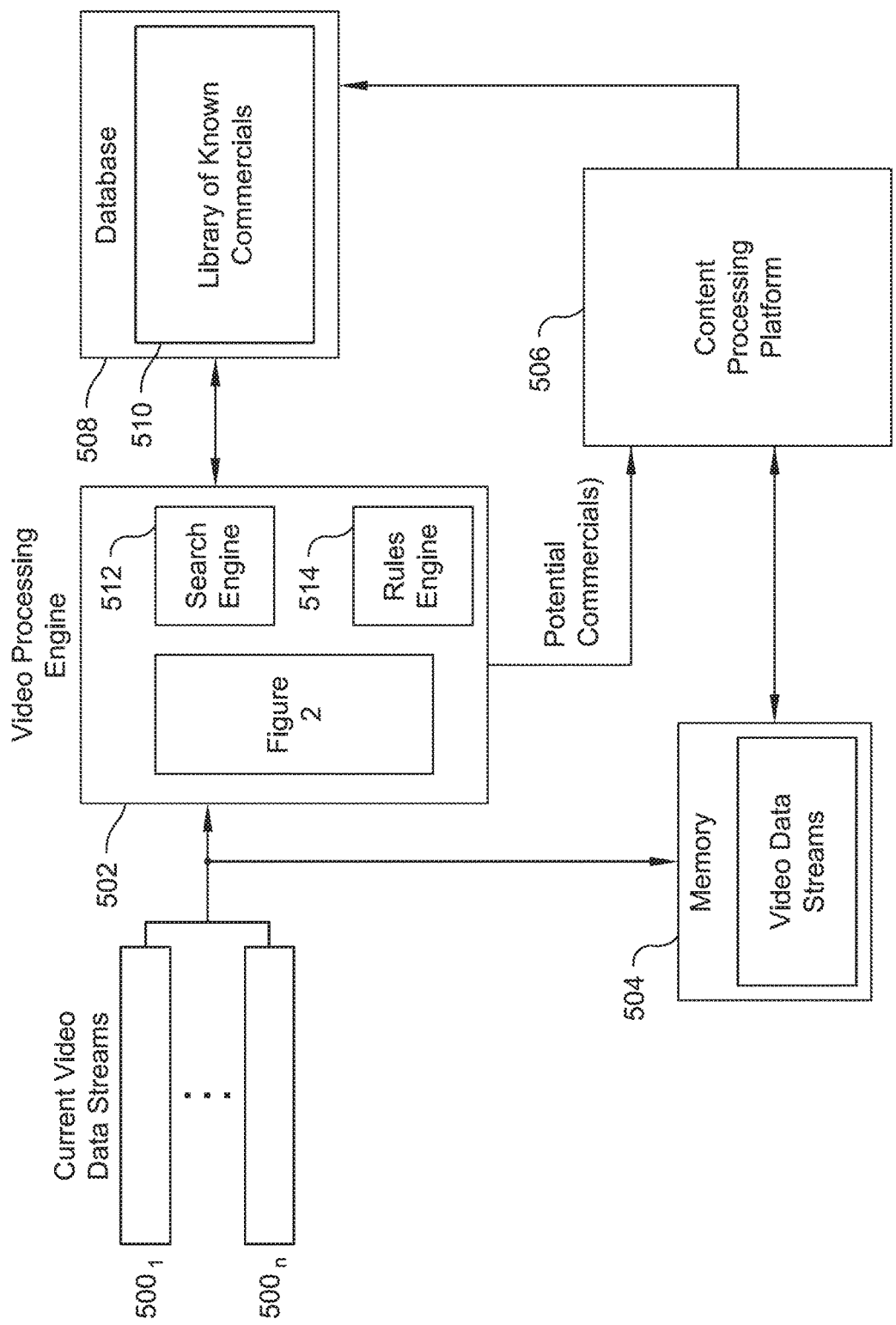
FIG. 5 is a schematic diagram of a system for implementing one preferred embodiment of the present invention.

FIG. 5 shows one preferred embodiment of a system 500 for implementing the process described above. Current video data streams $500_1$ to $500_n$ are received by video processing engine 502 and are also sent to memory 504 for temporary storage. The video processing engine 502 implements the process of FIG. 2. Potential commercials are flagged and identification (ID) data is sent to content processing platform 506 which uses the ID data to retrieve the related video data segment (i.e., the clip) from the memory 504. The ID data includes at least the channel of the video data stream and the beginning and end of the segment. For example, referring to Example 3 of FIG. 3, the video segment from time 13:02:17 to 13:02:47 on the appropriate date would be sent to the content processing platform 506. Also, neighboring segments that are immediately before and/or after this video segment (e.g., 5 sec segments) may optionally be included if a manual review is being performed as a double-check that the potential commercial was accurately identified.

The memory 504 preferably buffers only the most recent video data streams. After the video processing engine 502 completes its work on a portion of the video data streams and the content processing platform 506 has had sufficient time to retrieve any segments that it needs, the memory 504 may purge those video data streams.

To further improve the efficiency of the process, database 508 containing a library of known commercials 510 is optionally provided. Any potential commercials that are identified by the video processing engine 502 may be preliminarily compared to those in the library of known commercials 510 and if a match is found, they can be eliminated from further processing by the content processing platform 506. The video processing engine may include a search engine 512 that is used for this purpose. Alternatively, database 508 may be in direct communication with the content processing platform 506, and the comparison may be performed in the content processing platform 506 which eliminates any matching commercials prior to performing its content processing functions.

The comparison process may be performed very quickly and efficiently by using an automated content recognition (ACR) system. One type of ACR system having such a search engine uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Pat. Nos. 2011/0289114 (Yu et al.), 2013/0071090 (Berkowitz et al.), and 2013/0205318 (Sinha et al.), each of which are incorporated by reference herein. Accordingly, the details of the ACR process is not further described.

The content processing platform 506 uses any combination of automated, semi-automated and manual (human-aided) processes to determine if a potential commercial is actually a commercial, and if so, confirm the exact start and stop time represented by a date and time of day. The content processing platform 506 also tags the commercial with appropriate metadata, as is also well-known in the art. The commercial and its metadata may then be added to the library of known commercials 510. That is, once a commercial has been properly clipped by the platform 506, appropriate identification and metadata is associated with the clip. FIG. 3 of U.S. Pat. No. 9,628,836 (Kalampoukas et al.), which is incorporated by reference herein, shows an example of how commercials are stored with identification information and metadata. In FIG. 3, some of the commercials are not exact integer multiples of time lengths such as 5 seconds or 15 seconds. However, as discussed below in section 4, approximations can be allowed to account for these situations.

The video processing engine 502 may optionally include a rules engine 514 that provides rules for addressing transition detection failures and false identifications of potential commercials, as discussed below.

1. Transition Detection

As discussed above, examples of a transition include consecutive black frames, silent audio frames, significant changes in audio level, significant changes in image nature or quality, or any combination thereof. Many of these detection techniques are described in the Satterwhite et al. article highlighted above, and are well-known in the art. Additional audio-based techniques for detecting transitions are disclosed in U.S. Pat. No. 8,925,024 (Wright et al.) and U.S. Pat. No. 6,819,863 (Dagtas et al.). More specifically, U.S. Pat. No. 8,925,024 discloses detecting transitions using an amount of "audio randomness" and U.S. Pat. No. 6,819,863 discloses detecting transitions using a "category change rate." The disclosures of both of these patents are incorporated by reference herein.

The scope of the present invention is not limited to the transition detection processes highlighted above, and includes other transition detection processes that can successfully achieve this function.

2. Transition Detection Failures and False Identifications of Potential Commercials Referring again to FIG. 1, there may be instances where no type of transition is detected at the start or end of a commercial. If so, the process described above will not detect the potential commercial. However, as discussed below, other techniques exist to identify potential commercials that may run in parallel with this process.

Furthermore, there may be instances wherein false identifications of potential commercials will occur. For example, a time difference between detected transitions may occur within program content that coincidentally meets the criteria for a potential commercial, namely, that the time difference is an integer multiple of the first predetermined time length, and also has an overall time length that is equal to or less than the second predetermined time length. However, other rules may be used to cull out such false identifications, such as the following rules provided in the rules engine 514:

1. If there are no potential commercials identified as being immediately adjacent in time to the potential commercial, there is a high probability that it is a false identification because commercials typically are part of a commercial break that includes more than one commercial.

2. If a block of potential commercials are identified as being relatively close in time to the individual potential commercial, such as 2-10 minutes, there is a high probability that it is a false identification because there is typically a significant amount of program content (e.g., greater than 10 minutes) between commercial breaks.

These rules may operate to avoid sending the potential commercial to the content processing platform, or these rules may operate within the content processing platform to eliminate the potential commercial as a candidate before any further processing is performed by the content processing platform.

False identifications of potential commercials may also occur within commercial breaks. For example, referring to FIG. 1, if there is no detected transition between C1 and C2, but the time difference between the one identified transition within C1 and one of the two identified transitions within C2 coincidentally meets the two criteria, portions of C1 and C2 will be identified as being a single potential commercial (i.e., the same potential commercial). Again, rules in the rules engine 514 may be applied to detect such errors. For example, if C3 is identified as a potential commercial, there will be a significant time gap between C3 and the falsely presumed potential commercial formed by parts of C1 and C2, such as multiple seconds. Since there is typically not significant time gaps between commercials, there is a high probability that the potential commercial identified immediately prior to C3 is not actually a single commercial. This information may be used to drop the potential commercial altogether from further processing, or it may be used to cause the additional time segments before and after the potential commercial to be captured and used during subsequent analysis.

Furthermore, other commercial detection processes may execute in parallel to this process, such as methods for identifying potential commercials by detecting repeating content, described in U.S. application Ser. No. 15/341,436 filed Nov. 2, 2016, entitled "System and method for detecting unknown TV commercials from a live TV stream," now U.S. Pat. No. 10,108,718, which is incorporated by reference herein.

3. Audio Data Streaming

In one alternative embodiment, the system described above may be used to detect potential commercials in an audio data stream, which may include (i) a conventional broadcast audio signal, such as AM/FM or satellite radio, or (ii) streaming services that deliver audio content to a user's device that is connected to a network. The same system described above may be used to implement this embodiment wherein the audio data stream is processed in the same manner as the audio portion of the video data stream and the segments are audio segments. In the audio-only embodiment, the transition detection processes are limited to those which function using only audio data.

4. Approximations of Commercial Lengths/Rounding of Integer Multiple Calculation As shown in FIG. 3 of U.S. Pat. No. 9,628,836, some commercials are not exact integer multiples of time lengths such as 5 seconds or 15 seconds. For example, a commercial may be 29 seconds or 58 seconds. To capture these situations, the calculation of the integer multiple preferably allows for very minor rounding up or down so as to capture potential commercials that are very slightly longer or shorter than a typical standard commercial length, such as commercials that have time lengths such as 29 seconds, 31 seconds, 58 seconds, 59 seconds, 61 seconds, 62 seconds, and the like.

5. Hardware/Software Configurations

The present invention may be implemented with any combination of hardware and software. If implemented as a computer-implemented apparatus, the present invention is implemented using means for performing all of the steps and functions described above.

When implemented in software, the software code for the video processing engine 502 and its search engine 512 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the video processing engine 502 and its search engine 512 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The video processing engine 502 is not a general-purpose computer, but instead is a specialized computer machine that performs a myriad of video processing functions that are not native to a general-purpose computer, absent the addition of specialized programming.

The video processing engine 502, database 508, memory 504 and content processing platform 506 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of detecting the presence of potential commercials in a video data stream that contains (i) segments of program type content, and (ii) commercial content, wherein the commercial content appears in a commercial break between segments of program type content, each commercial break including one or more commercials, wherein each of the commercials has an expected time length that is an integer multiple of a first predetermined time length, and has an overall time length that is equal to or less than a second predetermined time length, the method comprising:
 (a) receiving, by a video processing engine, a video data stream;
 (b) detecting, by the video processing engine, transitions in the audio or video of the video data stream and recording the time of the transitions;
 (c) calculating for each transition, by the video processing engine using the time of the transitions, time differences between one or more successive transitions;
 (d) identifying, by the video processing engine, any time differences between the one or more successive transitions that are an integer multiple of the first predetermined time length, and that have an overall time length that is equal to or less than the second predetermined time length, wherein the contents of the video data stream associated with the identified time differences are potential commercials; and
 (e) electronically sending the contents of the video data stream associated with the identified time differences to a content processing platform that performs recognition processing of the contents to identify any potential commercials.

2. The method of claim 1 wherein the first predetermined time length is 5 seconds.

3. The method of claim 2 wherein the second predetermined time length is 60 seconds.

4. The method of claim 1 wherein the first predetermined time length is 15 seconds.

5. The method of claim 4 wherein the second predetermined time length is 60 seconds.

6. The method of claim 1 wherein a transition in the audio or video of the video data stream is detected by the presence of consecutive black frames, silent audio frames, significant changes in audio level, significant changes in image nature or quality, or any combination thereof.

7. The method of claim 1 wherein in step (c), the video processing engine only calculates the time differences between successively adjacent transitions.

8. An automated system for detecting the presence of potential commercials in a video data stream that contains (i) segments of program type content, and (ii) commercial content, wherein the commercial content appears in a commercial break between segments of program type content, each commercial break including one or more commercials, wherein each of the commercials has an expected time length that is an integer multiple of a first predetermined time length, and has an overall time length that is equal to or less than a second predetermined time length, the system comprising:
 (a) a video processing engine configured to:
  (i) receive a video data stream;
  (ii) detect transitions in the audio or video of the video data stream and record the time of the transitions;
  (iii) calculate for each transition, using the time of the transitions, time differences between one or more successive transitions;
  (iv) identify any time differences between the one or more successive transitions that are an integer multiple of the first predetermined time length, and that have an overall time length that is equal to or less than the second predetermined time length, wherein the contents of the video data stream associated with the identified time differences are potential commercials; and
 (b) a content processing platform that electronically receives the contents of the video data stream associated with the identified time differences, and that performs recognition processing of the contents to identify any potential commercials.

9. The automated system of claim 8 wherein the first predetermined time length is 5 seconds.

10. The automated system of claim 9 wherein the second predetermined time length is 60 seconds.

11. The automated system of claim 8 wherein the first predetermined time length is 15 seconds.

12. The automated system of claim 11 wherein the second predetermined time length is 60 seconds.

13. The automated system of claim 8 wherein a transition in the audio or video of the video data stream is detected by the presence of consecutive black frames, silent audio frames, significant changes in audio level, significant changes in image nature or quality, or any combination thereof.

14. The automated system of claim 8 wherein the video processing engine is configured to only calculate the time differences between successively adjacent transitions.

* * * * *